United States Patent [19]

Tanaka et al.

[11] Patent Number: 5,410,875
[45] Date of Patent: May 2, 1995

[54] EXHAUST-GAS PURIFICATION DEVICE FOR AN INTERNAL COMBUSTION ENGINE OR THE LIKE

[75] Inventors: Masakazu Tanaka, Okazaki; Hiroshi Mori, Ichinomiya; Mamoru Mabuchi, Kariya, all of Japan

[73] Assignee: Nippondenso Co., Ltd., Kariya, Japan

[21] Appl. No.: 109,500

[22] Filed: Aug. 20, 1993

[30] Foreign Application Priority Data

Aug. 21, 1992 [JP] Japan ................. 4-222887
Aug. 25, 1992 [JP] Japan ................. 4-226120

[51] Int. Cl.$^6$ .............................. F01N 3/20
[52] U.S. Cl. ........................ 60/288; 60/297; 60/311; 60/324
[58] Field of Search ............... 60/297, 287, 288, 276, 60/311, 324, 293

[56] References Cited

U.S. PATENT DOCUMENTS

| | | | |
|---|---|---|---|
| 2,747,976 | 5/1956 | Houdry | 60/297 |
| 3,197,287 | 7/1965 | Innes | 60/288 |
| 3,338,682 | 8/1967 | Fowler | 60/288 |
| 4,485,621 | 12/1984 | Wong | 60/288 |
| 4,974,414 | 12/1990 | Kono | 60/288 |
| 5,090,200 | 2/1992 | Arai | 60/286 |
| 5,125,231 | 6/1992 | Patil | 60/288 |
| 5,140,811 | 8/1992 | Minami | 60/288 |
| 5,195,318 | 3/1993 | Shinzawa | 60/288 |
| 5,271,906 | 12/1993 | Yuuki et al. | |

FOREIGN PATENT DOCUMENTS

| | | |
|---|---|---|
| 57-159908 | 10/1982 | Japan . |
| 275327 | 3/1990 | Japan . |
| 2135126 | 5/1990 | Japan . |
| 3194113 | 8/1991 | Japan . |
| 3302154 | 9/1991 | Japan . |

Primary Examiner—Ira S. Lazarus
Assistant Examiner—Daniel J. O'Connor
Attorney, Agent, or Firm—Cushman, Darby & Cushman

[57] ABSTRACT

An exhaust-gas purification device for an internal combustion engine or the like which can effectively purify hydrocarbon (HC) among the toxic components of the exhaust-gas emitted by the engine or the like even when the temperature of said exhaust-gas is relatively low, and an exhaust-gas purification device, wherein, in an exhaust system in which a first purification-treatment section 4 carrying a catalyst 3 is placed in a main exhaust passage 2, a bypass passage 5 is placed which diverges from said main exhaust passage 2 and which later returns to said main exhaust passage 2 at a certain distance, and a second purification treatment section 7 carrying an absorbent 6 is placed in said bypass passage 5.

11 Claims, 9 Drawing Sheets

EXHAUST-GAS PURIFICATION DEVICE FOR AN INTERNAL COMBUSTION ENGINE OR THE LIKE

BACKGROUND OF THE INVENTION

1. Field of the Invention

The present invention relates to an exhaust-gas purification device for an internal combustion engine or the like. More particularly, the present invention relates to a device which can effectively purify the hydrocarbons (HC) among the toxic components in the exhaust gas emitted by an internal combustion engine or the like and can prevent said hydrocarbons from being released into the air even when the temperature of said exhaust-gas is relatively low (for example, immediately after the start of the engine).

2. Description of the Related Art

For purifying the exhaust-gas of automobiles, catalysts which carry noble metals (platinum, rhodium etc.) or the other metals are conventionally used. Such catalysts purify the toxic components of the exhaust-gas by performing the oxidation or reduction of these components (HC, CO, $NO_x$). Particularly, the catalyst purification of hydrocarbon (HC) is greatly influenced by exhaust-gas temperatures, and environmental temperatures from 350° to 400° C. and over are necessary for the purification of hydrocarbon (HC). Accordingly, immediately after the start of an internal combustion engine, the purification of hydrocarbon (HC) is not performed since the exhaust-gas temperature is so low that the catalyst used cannot reach the temperature above its activation temperature (350°–400° C.). Moreover, since the emission quantity of hydrocarbon (HC) is very large in the low-temperature condition of the engine immediately after its start, there arises a problem that a great quantity of hydrocarbon (HC) may be released into the air while the exhaust-gas temperature is low in the above-mentioned low-temperature period. Consequently, in order to solve the above-mentioned problem, known exhaust-gas purification devices have been proposed which comprise conventional catalysts placed in engine exhaust systems and HC trappers placed upstream from said catalysts. These HC trappers contain absorbents for absorbing the hydrocarbon (HC) released in the low-temperature condition of engines. (Cf. e.g. Unexamined Patent Publication No. 2-75327, No. 3-194113 and the like).

In the exhaust-gas purification device disclosed in the Unexamined Patent Publication (Kokai) No. 2-75327, a zeolite absorbent is placed upstream from a catalyst and this absorbent is used in combination with this catalyst. In this device, as long as exhaust-gas temperature is low, said absorbent traps hydrocarbon (HC), and as long as the exhaust-gas temperature is high, the catalyst purifies both the hydrocarbon (HC) which is desorbed from the absorbent and the hydrocarbon (HC) which is emitted by the engine. On the other hand, in the exhaust-gas purification device disclosed in the Unexamined Patent Publication (Kokai) No. 3-194113, an absorbent and a catalyst are placed in parallel. An exhaust-pipe containing the absorbent is connected to an exhaust-pipe containing the catalyst so that the exhaust-pipe containing the absorbent bypasses from the upstream section to the downstream section of the exhaust-pipe containing the catalyst. Furthermore, a selector valve is placed in the connecting section (i.e., the downstream junction) of the above-mentioned two exhaust pipes. During a certain period immediately after the start of the engine, the opening of the selector valve is adjusted so that the absorbent can absorb hydrocarbon (HC). When the exhaust-gas becomes hot, the selector valve is half-opened and this hot exhaust-gas flows into the absorbent. Thereby the hydrocarbon (HC) absorbed in the absorbent can be desorbed from the absorbent. Then the hydrocarbon (HC) desorbed is returned to the area upstream from the catalyst and is purified.

Since the above-mentioned known devices for absorbing and desorbing the hydrocarbon (HC) emitted from an engine or the like in its low-temperature condition (hereinafter referred to as "cold HC") is placed upstream from the catalyst, these devices must be heat-resistant. Therefore, in the devices disclosed in the Unexamined Patent Publication (Kokai) No. 2-75327 and the like, zeolite absorbents are used which are highly heat-resistant. However, in an extremely low temperature condition (especially less than 50° C.), the hydrocarbon (HC) absorption performance of zeolite is not always suitable, and activated carbon provides better results than zeolite. Furthermore, even in the case of using other kinds of absorbents, it is disadvantageous to the improvement of the hydrocarbon (HC) absorption ability to place such absorbents upstream from the catalyst since the absorption performance of those absorbents becomes better as their temperatures fall.

Furthermore, in the devices disclosed in the above-mentioned patent publications, because the desorption of the absorbed substances depends on the heat of the exhaust gas, the desorption speed must be low and it takes time to restore the absorbents.

SUMMARY OF THE INVENTION

Therefore, an object of the present invention is to overcome the disadvantage of the above-mentioned prior arts and to provide an exhaust-gas purification device for an internal combustion engine or the like which can effectively purify the hydrocarbon (HC) belonging among the toxic components of the exhaust-gas emitted by said engine or the like even when the temperature of said exhaust-gas is relatively low.

Another object of the present invention is to improve the "cold HC" absorbing performance of the exhaust-gas purification device and to realize the high-degree absorption and high-degree purification of cold HC by completely purifying the HC desorbed from the absorbent.

To accomplish the above-mentioned objects, the present invention adopts the following technical construction. Basically, the exhaust-gas purification device according to the present invention is characterized in that, in an exhaust system in which a first purification-treatment section carrying a catalyst is placed in the main exhaust passage, a bypass passage is placed which diverges from said main exhaust passage and later returns to said main exhaust passage at a certain distance, and a second purification-treatment section carrying a catalyst is placed in said bypass passage.

The above-mentioned exhaust-gas purification device according to the present invention can be realized in various embodiments. One such embodiment is characterized in that it comprises a bypass passage which diverges from a main exhaust passage at a position downstream from a catalyst device placed in an exhaust passage of an internal combustion engine; a selector valve which is placed at a junction of said bypass passage; an absorbent which is placed in said bypass passage, a catalyst which is placed in said bypass passage downstream from said absorbent and which is provided with a heater; an exhaust-gas temperature sensor which is placed upstream from said absorbent; and a control unit which controls said selector valve and said heater according to the exhaust-gas temperatures detected by said exhaust-gas temperature sensor.

Said exhaust-gas purification device according to the present invention adopts the above-mentioned construction. Therefore, when the temperature of the exhaust-gas emitted by the engine is low, said exhaust-gas is passed through the second purification-treatment section placed in said bypass passage and the hydrocarbon (HC) contained in said exhaust-gas is absorbed by the absorbent carried in said second purification-treatment section. On the other hand, when the temperature of the exhaust-gas from the engine becomes high and the catalyst becomes activated, said exhaust-gas is not passed through said bypass passage and the purification of the exhaust-gas is only performed by said first purification-treatment section which contains a catalyst and which is placed in the main exhaust passage. Thus it becomes possible to perform suitable purification-treatments according to the temperature of said exhaust-gas and to purify said hydrocarbon (HC) efficiently and reliably.

Furthermore, in another embodiment related to the present invention, when the temperature of the exhaust-gas becomes high and the catalyst becomes activated, said absorbent functions to desorb the hydrocarbon (HC) absorbed in it, which makes it possible to ensure the long-term effective use of the exhaust-gas purification device.

Furthermore, in this embodiment, at the same time as, or prior to, the passage change by the selector valve, electric current is sent into the heater which is attached to said catalyst placed downstream from the absorbent in order that said catalyst will be heated and activated. After the desorption of such toxic components as hydrocarbon (HC) absorbed in the absorbent, these desorbed toxic components are purified by the catalyst and released into the air.

DETAILED DESCRIPTION OF THE PREFERRED EMBODIMENTS

Some embodiments of the exhaust-gas purification device according to the present invention are described, in detail, with reference to drawings, below.

Figure 1:
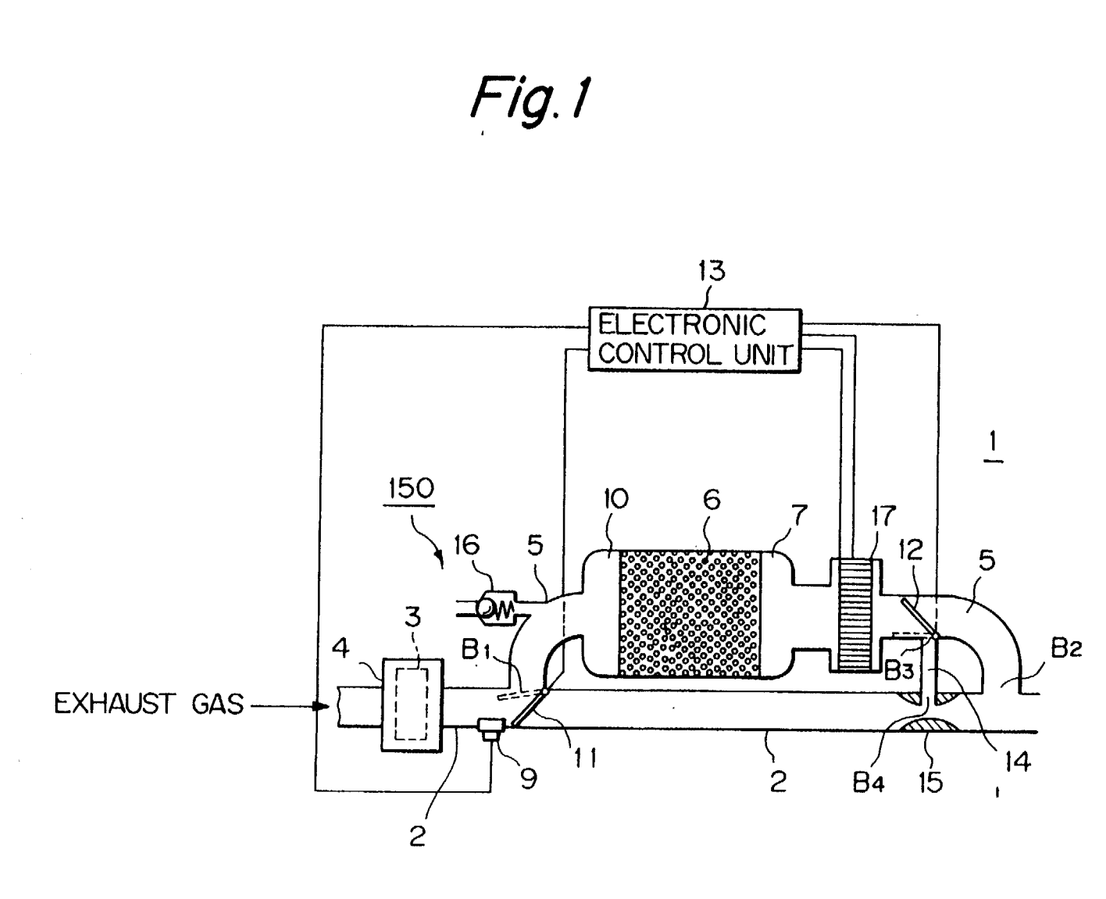
FIG. 1 is a schematic diagram of one embodiment of the exhaust-gas purification device in accordance with the present invention.

Referring to FIG. 1, the drawing shows a schematic diagram of one embodiment of the exhaust-gas purification device according to the present invention. The numeral 1 indicates an exhaust-gas purification device. As shown in this figure, in an exhaust system 100 which has a first purification-treatment section 4 carrying a catalyst 3 in a main exhaust passage 2, a bypass passage 5 is placed downstream from said first purification-treatment section 4, and a second purification-treatment section 7 is placed in the bypass passage 5. The bypass passage 5 is constructed so that it diverges from said main exhaust passage and later returns to said main exhaust passage at a certain distance. The second purification treatment section 7 carries an absorbent 6.

A first passage selector means 11 is placed in the vicinity of at least one of junctions B1 and B2 between said main exhaust passage 2 and said bypass passage 5. This first passage selector means 11 functions to guide said exhaust-gas into either said main exhaust passage 2 or said bypass passage 5.

Furthermore, it is preferable that at least one of said main exhaust passage 2 and said bypass passage 5 has a temperature sensor 9 for measuring the temperature of said exhaust-gas.

Said first passage selector means 11 operates in response to the output of the temperature sensor 9.

In the present invention, an absorbent is placed downstream from the catalyst 3 (for example, just before a muffler), which makes it possible to improve the absorbing ability for hydrocarbon (HC). In addition, for the purification of hydrocarbon (HC), a catalyst equipped with a heater is placed downstream from the absorbent. Furthermore, according to the present invention, it is possible to efficiently desorb hydrocarbon (HC) by means of a pressure-swing desorption method. In this pressure-swing desorption method, the pressure of the exhaust-gas flow is decreased and this decreased pressure is used for the desorption of the hydrocarbon (HC) absorbed in the absorbent. Thus it becomes possible to realize effective absorption and purification of the hydrocarbon (HC).

A construction example of the first embodiment of the exhaust-gas purification device according to the present invention is described below.

FIG. 1 shows a construction example of the present invention. The second purification-treatment section 7 which constitutes an exhaust-gas purifying means is placed downstream from the engine (not shown) and downstream from the first purification-treatment section 4. The first purification-treatment section 4 contains the catalyst 3 as shown in this figure. Said second purification-treatment section 7 is placed in the bypass passage 5 which diverges from the main exhaust passage 2 and which is installed in parallel with said main exhaust passage. The absorbent 6 which can absorb hydrocarbon (HC) is filled into and carried in said second purification-treatment section 7. This absorbent 6 is contained in a suitable absorbing cylinder 10. A known absorbent of a pellet, foam, honeycomb or mesh type can be used in the present invention. Furthermore, in this embodiment, a suitable selector valve is installed as said first passage-selector means 11 in the junction B1 between said main exhaust passage 2 and said bypass passage 5.

Furthermore, in this embodiment, in the bypass passage 5 a second passage-selector means 12 may be placed downstream from said second purification-treatment section 7 and in the vicinity of a junction B2 between said main exhaust passage 2 and said bypass passage 5.

Furthermore, in this embodiment, a temperature sensor 9 is installed. In order to drive said first passage-selector means 11 or said second passage-selector means 12 and to selectively pass said exhaust-gas through at least one of said main exhaust passage 2 and said bypass passage 5, this temperature sensor 9 measures the temperature of said exhaust-gas and transmits its output to a suitable electronic control unit 13. Therefore, said first passage-selector means 11 and said second passage-selector means 12 operate in response to the output of said temperature sensor 9.

Said temperature sensor 9 is generally located in said main exhaust passage 2 and, more concretely, it is preferable that said temperature sensor 9 is placed downstream from said first purification-treatment section 4 and between said first purification-treatment section 4 and the junction B1.

In addition, said temperature sensor 9 can be placed on the bypass passage 5 upstream from said second purification-treatment section 7.

Furthermore, in another construction example according to the present invention, another bypass passage 14 for directly connecting said bypass passage 5 to said main exhaust passage 2 is placed in said bypass passage 5 at an appropriate position downstream from said second purification-treatment section 7 and between the junction B2 and said second purification treatment section 7. This bypass passage 14 functions as a desorption passage which promotes the desorption of the hydrocarbon (HC) from said absorbent 6 when said exhaust-gas temperature becomes high.

Thus it is preferable that a static-pressure reducing means 15 for producing low pressure within said bypass passage 14 is placed in the main exhaust passage 2 and in the vicinity of a junction B4 between the main exhaust passage 2 and said bypass passage 14.

As the static-pressure reducing means 15, for example, a diffuser, a venturi tube or the like is arranged or formed. Anything can be used as the static-pressure reducing means 15 so long as it causes a minimal pressure loss in said main exhaust passage 2 and can cause considerable static-pressure decrease in said bypass passage 14.

Furthermore, in this embodiment, said second passage-selector means 12 can also be placed in the vicinity of a junction B3 between said bypass passage 14 and said desorption passage. This second passage-selector means 12 can also be constructed so that it will operate in response to the output of said temperature sensor.

Said first passage-selector means 11 operates in response to the commands of said arithmetic and control unit 13 according to the temperatures of said exhaust gas in order to change the flow route of said exhaust-gas from said main exhaust passage 2 to said bypass passage 5 and vice versa. Similarly said second passage-selector means 12 operates to change the flow route of said exhaust-gas from said bypass passage 5 to said bypass passage 14 and vice versa according to the temperatures of said exhaust-gas.

Furthermore, in this embodiment, a check valve 16 can be installed which allows ambient air into said second purification-treatment section 7. Said check valve 16 can be placed at any suitable position upstream from said second purification-treatment section 7 in said bypass passage 5.

Furthermore, in this embodiment, in said bypass passage 5 and downstream from said second purification-treatment section 7, a third purification treatment section 17 in which a catalyst and a heating means are carried as one body can be installed. By the installation of said third purification-treatment section 17, it becomes possible to actively purify the hydrocarbon (HC) which is desorbed from the absorbent carried in said second purification-treatment section 7. This provides the improvement of the purification efficiency in the exhaust gas purification device according to the present invention.

The catalyst placed in said third purification treatment section 17 can be the same as the catalyst placed in said first purification-treatment section 4. Preferably, the heating temperature of said heating means placed in said third purification treatment section 17 is electrically controlled under the commands of said electronic control unit 13.

Now, the operations of the above-mentioned embodiments of the present invention will be described below.

The operations of the above-mentioned embodiments of the present invention will be described with reference to FIG. 1. Immediately after the start of the engine (not shown) located at the left side of the exhaust-gas purification device, the exhaust-gas temperature is still low and the engine emits the exhaust-gas containing a large quantity of cold HC. Since the temperature of the catalyst 3 remains lower than its activation temperature as long as the exhaust-gas temperature is low, the cold HC is not purified and it flows through the main exhaust passage 2. The exhaust gas temperature in this condition is being monitored by said temperature sensor 9. When the exhaust gas temperature is low as described above, the selector valve which functions as said first passage selector means 11 is in the position shown in FIG. 1 and blocks off the main exhaust passage 2 according to the signal from the electronic control unit 13. Thus the exhaust-gas flows through said bypass passage 5. The cold HC contained in th exhaust-gas is absorbed into the absorbent placed in the second purification-treatment section 7 and is prevented from being released into the air. On the other hand, while this cold HC absorption continues, the signal from the arithmetic and control unit 13 makes said second passage-selector means 12 be in the position shown by the dotted line in FIG. 1 and said second passage-selector means 12 blocks off the desorption passage. When the engine, thereafter, warms up and the exhaust-gas temperature becomes high enough for the temperature of the catalyst 3 in the first purification treatment section 4 exceeds its activation temperature, the absorption ability of the absorbent 6 in the first purification treatment section 4 declines and the absorbent 6 begins to desorb HC. The selector valve 8 of the first passage-selector means 11 is moved into the position shown by the dotted line of FIG. 1, the bypass passage 5 is blocked off, and the exhaust-gas is passed through the main exhaust passage 2.

Table 1, below, lists the examples of the absorbent 4 and their HC absorbable temperatures, HC desorption temperatures and heat resistant temperatures.

TABLE 1

| absorbent | HC absorbable temp. | HC desorption temp. | heat resistant temp. |
|---|---|---|---|
| active carbon | below 100° C. | 100 to 400° C. | 400 to 600° C. |
| zeolite | below 300° C. | 300 to 800° C. | 800 to 1000° C. |
| γ-alumina | below 150° C. | 150 to 300° C. | 650 to 750° C. |

Among these absorbents, active carbon is the best absorbent regarding the very low temperature (below 50° C.) absorption quantity of cold HC. If active carbon is used as the absorbent, the second purification-treatment section 7 must be located as far as possible from the catalyst of the first purification-treatment section 4. The distance between the catalyst 3 of the first purification-treatment section 4 and the absorbent 6 of the second purification-treatment section 7 must be selected so that the catalyst 3 will have already reached its activation temperature (350° to 400° C.) when the absorbent 6 reaches its desorption temperature. When, in the above-mentioned condition, the first passage-selector means 11 operates and the exhaust gas passes through the main exhaust passage 2, the exhaust-gas itself has already been purified by the upstream catalyst 3 and the release of hydrocabon (HC) into the air can be prevented.

Figure 2:
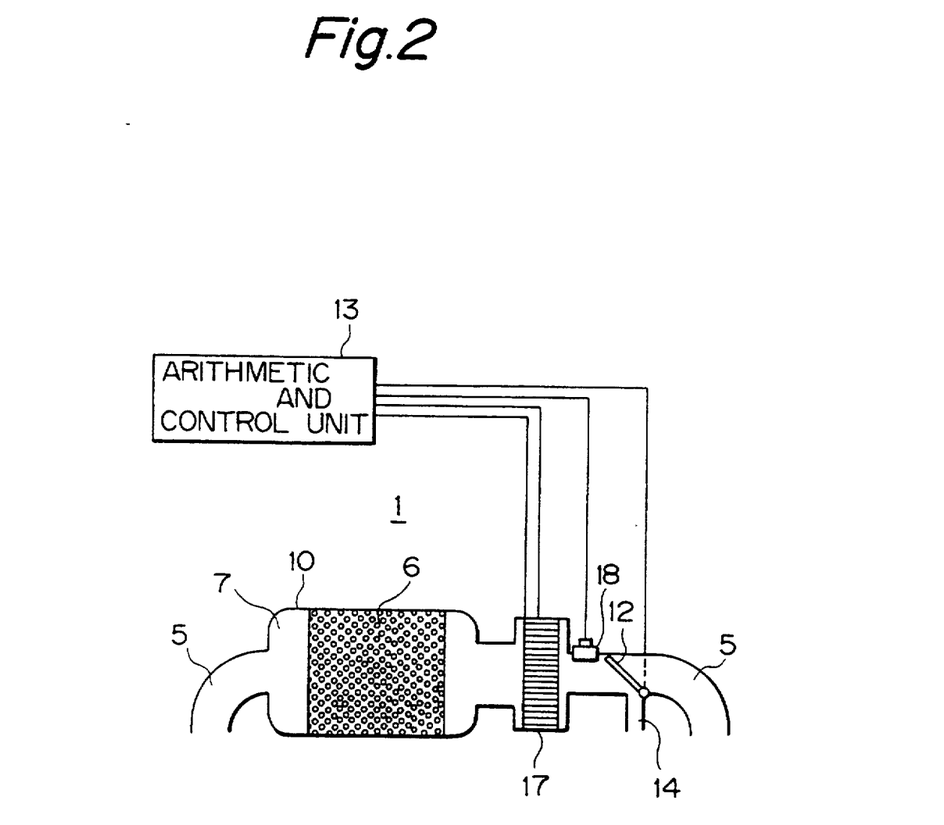
FIG. 2 is a schematic diagram of another embodiment of the exhaust-gas purification device in accordance with the present invention.

Now the method for desorbing and purifying the cold HC absorbed in the absorbent of the second purification treatment section 7 during low temperature period of the exhaust-gas is described below. While the exhaust-gas temperature is high (not less than the desorption temperature of said absorbent 6) and flows through the main exhaust passage 2, the electronic control unit 13 supplies electric current to the heating means of the catalyst placed in the third purification-treatment section 17 in order to heat up this catalyst to its activation temperature (350° to 400° C. or more). For example, it is judged from the current supply duration whether or not this catalyst has reached its activation temperature. Alternatively, an exhaust-gas temperature sensor 18 can be placed downstream from the third purification-treatment section 17 as shown in FIG. 2, and the above-mentioned judgement of the catalyst temperature can be performed in accordance with the temperature in the vicinity of said sensor 18. When the catalyst reaches its activation temperature, the exhaust-gas temperature is not less than the desorption temperature of the absorbent 6 and is, further, less than the heat resistant temperature of said absorbent 6, the first passage selector means 11 and the second passage-selector means 12 operates to pass the exhaust-gas through the bypass passage 5 so that the necessary quantity of the exhaust-gas flow for the desorption of the hydrocarbon (HC) absorbed in the absorbent 6 can be obtained. In this situation, the valve of the first passage-selector means 11 opens the inlet port of the bypass passage 5. On the other hand, the second passage-selector means 12 moves to the position shown by the solid line in FIG. 2 in order to block off the bypass passage 5 and to open the desorption passage 14. Therefore, thanks to the pressure swing and the exhaust-gas heat both of which are to be described later, the cold HC absorbed in the absorbent 6 is desorbed from the absorbent 6 and then is made to flow toward downstream. In the third purification-treatment section 17 placed downstream from the second purification treatment section 7, its catalyst has reached its activation temperature, and the HC desorbed from the absorbent 6 is purified here. Furthermore, in order to improve the HC purification performance of the device, the air (secondary air) for the oxygen supplementation can be introduced into bypass passage 5 through the check valve 16. This check valve 16 draws in ambient air by the pressure pulsation of the exhaust-gas through the venturi 15. Alternatively, the exhaust-gas from third purification-treatment section 17 passes through the desorption passage 14 and enters into the main exhaust passage 2. Said desorption passage 14 is connected to the static-pressure reducing means 15 placed in the main exhaust passage 2. When an exhaust-gas portion which is diverged at the first passage-selector means passes through the static-pressure reducing means 15, the static pressure in the desorption passage 14 considerably declines. Since the exhaust-gas flowing in the bypass passage 5 is drawn in as a result of this reduced pressure (a pressure-swing method), the desorption performance for desorbing hydrocarbon (HC) from the absorbent 6 becomes higher than that of the HC desorption method which only utilizes exhaust-gas heat. For the judgement of the completion of the above-mentioned desorption and purification, the overall valve open time which has elapsed since the second passage-selector means 12 opened said desorption passage to start the exhaust-gas purification/desorption is calculated. If this calculated numerical value exceeds the predetermined numerical value of the total valve open time, the above-mentioned desorption and purification is judged to have been completed.

The above-stated consecutive operations are described below in reference to the flow chart shown in FIG. 3.

Figure 3:
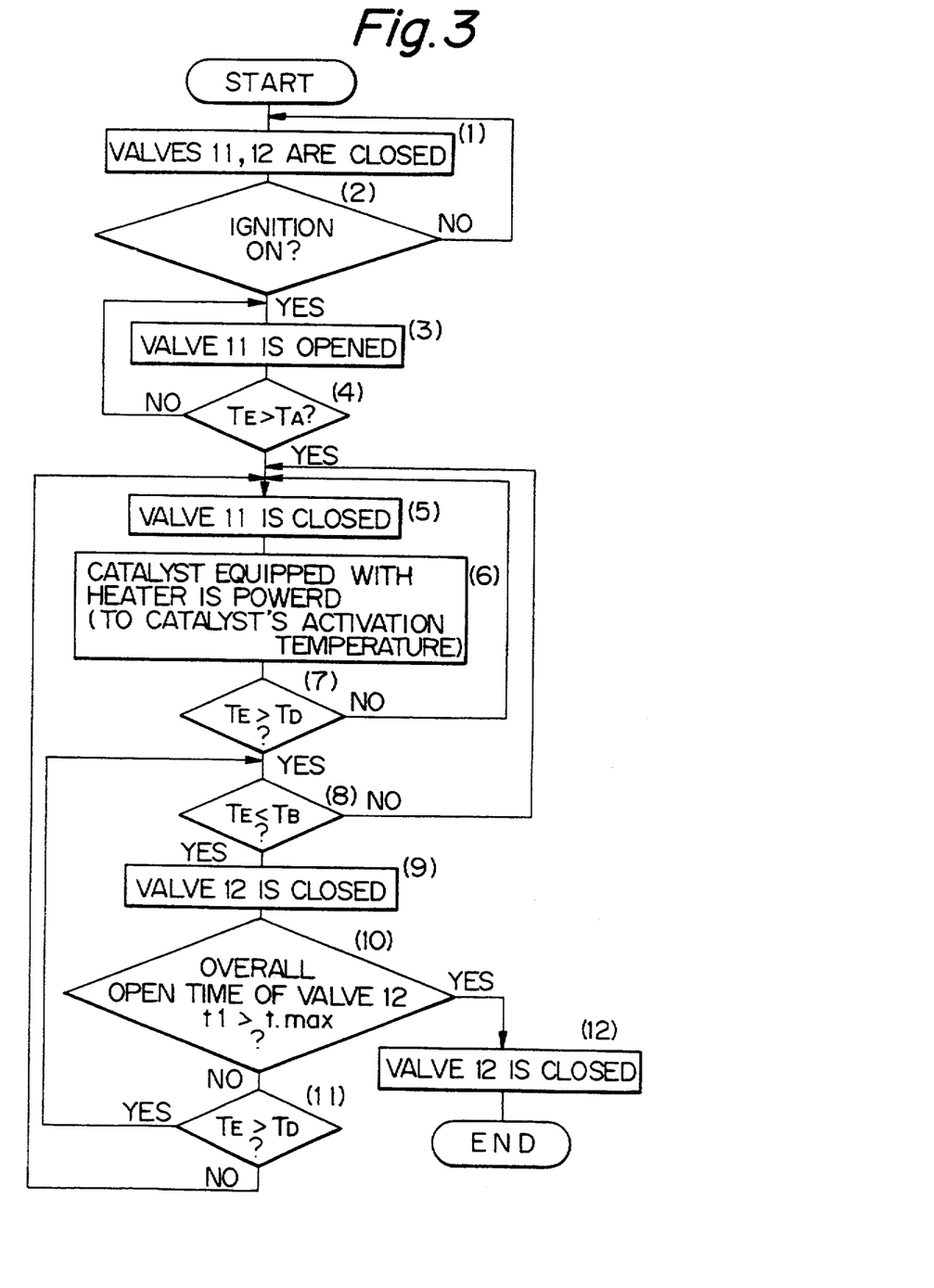
FIG. 3 is a flow chart showing the operation-procedures of the exhaust-gas purification device in accordance with the present invention.

FIG. 3 is the flow chart which shows the operation-procedures of the exhaust purification device according to the present invention. After the start, in the step (1), said first passage-selector means 11 is set into the position shown by the dotted line (FIG. 1). This first passage-selector means 11 blocks off the inlet of the bypass passage 5. On the other hand, said second passage-selector means 12 is in the position shown by the dotted line (FIG. 1). This second passage-selector means 12 blocks off the inlet of the desorption passage 14.

In the step (2), an engine or the like is started, for example, by the operation of an ignition-key. In the step (3), said first passage-selector means 11 moves to the position shown by the solid line in FIG. 1 to open the bypass passage 5. Thus the low temperature exhaust-gas passes through the first purification-treatment section 4 and reaches the second purification-treatment section 7. In the second purification-treatment section 7, the absorbent 6 carried in this section 7 absorbs the hydrocarbon (HC) contained in said low temperature exhaust-gas. Then the exhaust-gas from which said hydrocarbon (HC) was removed travels to the junction B2 through the bypass passage 5 and returns into said main exhaust passage 2.

In the step (4), it is determined whether or not the temperature ($T_E$) of said exhaust gas exceeds the absorbing temperature ($T_A$) of said absorbent 6. If the result of this determination is "NO", the operation is returned to the step (3) and the steps (3) and (4) are repeated. If the result of this determination is "YES", the step (5) is executed. In the step (5), said first passage-selector means 11 moves to the position shown by the dotted line in FIG. 1 to open the main exhaust passage 2 and, at the same time, to slightly open the bypass passage 5 so that the exhaust-gas can partly flow into the bypass passage 5.

Thus, the main part of the exhaust-gas from which said hydrocarbon (HC) is considerably eliminated by the catalyst 3 of the first purification-treatment section 4 flows through the main exhaust passage 2, and the remaining part of this exhaust-gas passes through the bypass passage 5 to the absorbent 6 in the second purification treatment section 7. In the second purification-treatment section 7, said remaining part of the exhaust-gas is used for the desorption of the hydrocarbon (HC) from the absorbent 6.

Said remaining part of the exhaust-gas which flows through the bypass passage 5 in the step (5) functions to promote the desorption of said hydrocarbon (HC) from the absorbent 6.

During the operation period of the step (5), said second passage-selector means 12 is in the position shown by the dotted line (FIG. 1) and blocks off the inlet of the desorption passage 14 in the same way as in the step (3).

Then, in the step (6), the heating means of the catalyst placed in the third purification-treatment section 17 is heated up to the determined temperature under the command of the arithmetic and control unit 13, and the hydrocarbon (HC) desorbed from the absorbent 6 is purified.

In the step (7), it is determined whether or not the temperature ($T_E$) of said exhaust-gas exceeds the desorption temperature ($T_D$) which is necessary to desorb the hydrocarbon (HC) from the absorbent 6. If the result of this determination is "NO", the operation is returned to the step (5) and the steps (5) to (7) are repeated. If the result of this determination is "YES", the step (8) is executed and it is determined whether or not the temperature ($T_E$) of said exhaust-gas is lower than the heat resistant temperature ($T_B$) of the absorbent 6. If the result of this determination is "NO", the operation is returned to the step (5) and the steps (5) to (8) are repeated. If the result of this determination is "YES", the step (9) is executed. In this step, in order to prevent the exhaust-gas from flowing into the bypass passage 5, said second passage-selector means 12 operates and said selector valve moves to the position shown by the solid line in FIG. 1. At the same time as this, the inlet of said desorption passage 14 opens and the exhaust-gas coming from the third purification-treatment section 17 passes through said desorption passage 14 to the main exhaust passage 2.

In the step (10), it is determined whether or not the overall time (t1) for which said desorption passage 14 remains opened exceeds the predetermined time (tmax). If the result of this determination is "YES", the step (12) is executed. In the step, (12), said second passage-selector means 12 operates to block off said desorption passage 14. If the result of the determination in step (10) is "NO", the step (11) is executed. In this step (11), it is determined whether or not the temperature ($T_E$) of said exhaust-gas is higher than the desorption temperature ($T_D$). If the result of this determination is "NO", the operation is returned to the step (5) and the steps (5) to (11) are repeated. If the result of this determination is "YES", the operation is returned to the step (8) and the steps (8) to (11) are repeated.

Now still another embodiment of the exhaust-gas purification device according to the present invention will be described below with reference to FIGS. 4 and 5.

In the above mentioned embodiments, the desorption of the hydrocarbon (HC) from the absorbent 6 is performed by means of the pressure-swing desorption method after the exhaust-gas temperature reaches the desorption temperature of the absorbent 6. However, if a heater is placed in the second purification-treatment section 7 which carries the absorbent 6 and the absorbent 6 such as zeolite is heated by this heater, the desorption of the hydrocarbon (HC) will be promoted still more.

Figure 4:
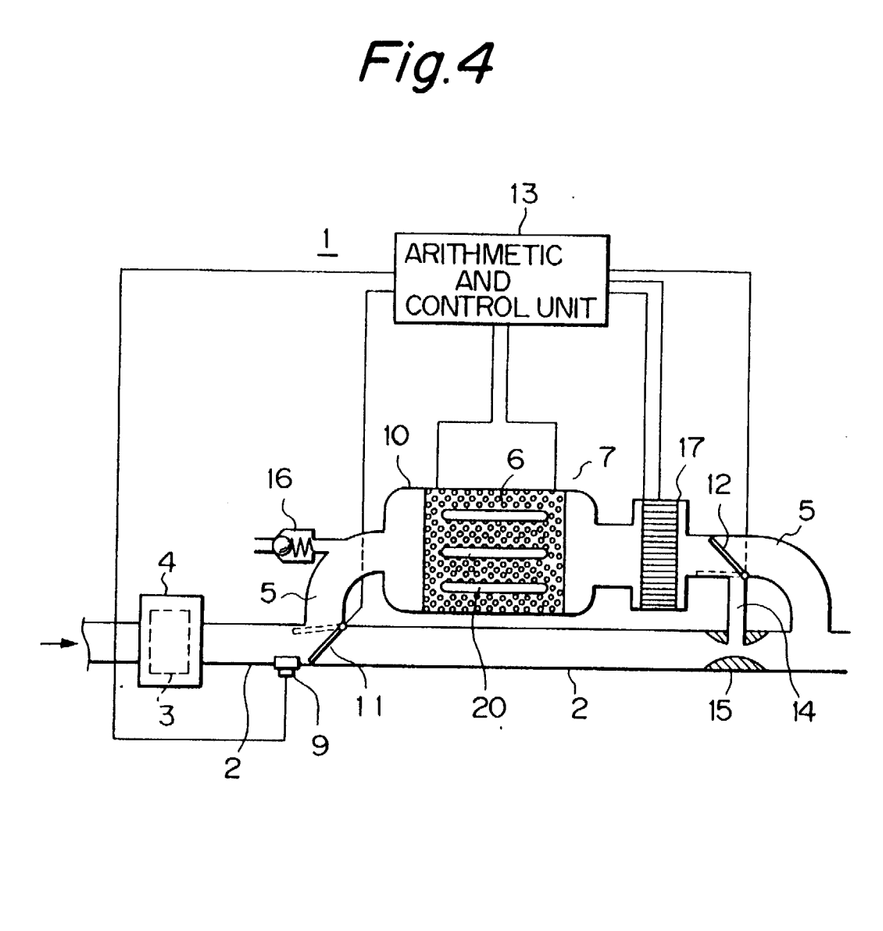
FIG. 4 is a schematic diagram of still another embodiment of the exhaust-gas purification device in accordance with the present invention.

The construction of the embodiment which has a heater placed in the second purification-treatment section 7 is shown in FIG. 4. Any heating means or heater such as PTC, nichrome wire or the like can be employed as the said heater.

Figure 5:
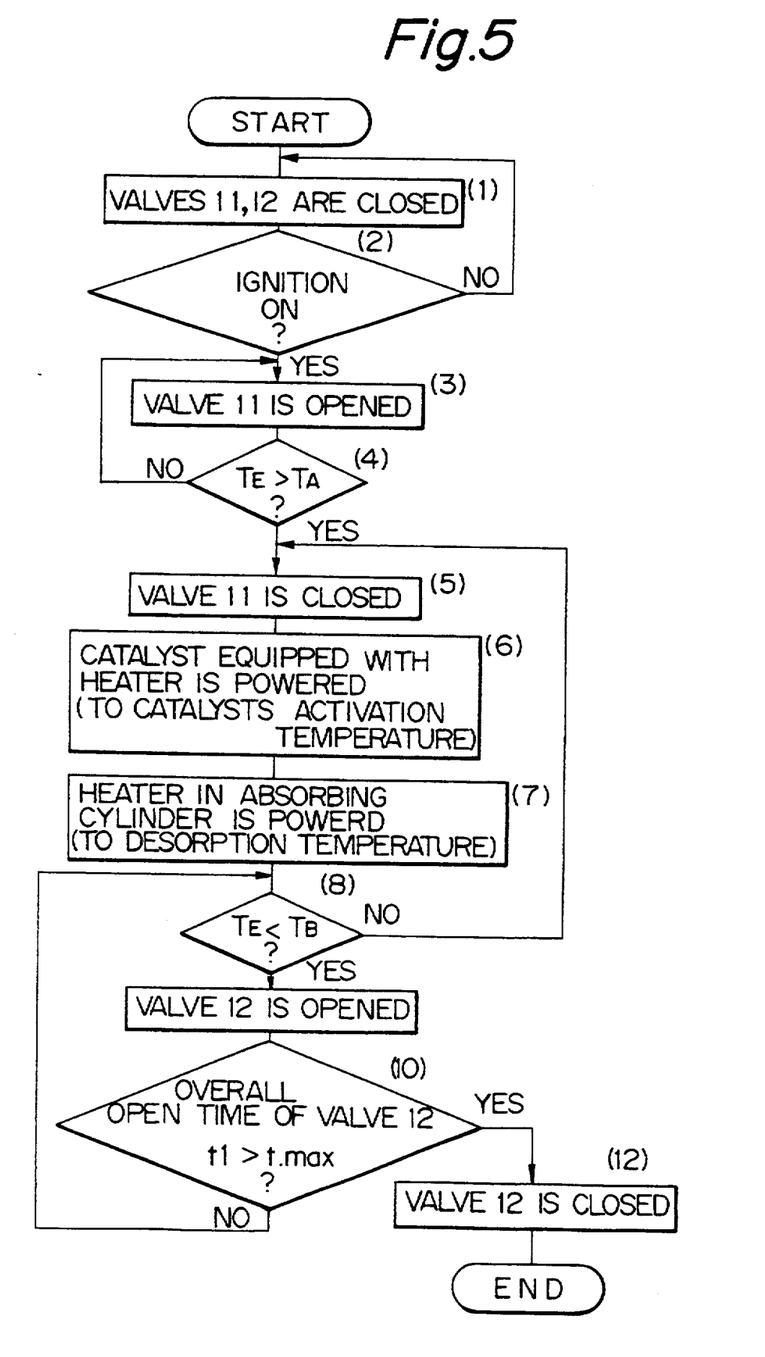
FIG. 5 is a flow chart showing the operation-procedures of the exhaust-gas purification device shown in FIG. 4.

The operation-procedures of such embodiment are shown in the flow chart of FIG. 5.

The flow chart of FIG. 5 is substantially similar to the flow chart of FIG. 3 except that the step (7) of FIG. 3 is replaced with the step (7') in FIG. 5. In this step (7'), the heater placed in the second purification-treatment section 7 is powered and the absorbent 6 is heated to the determined temperature.

In this embodiment, therefore, the step (11) of FIG. 3 is not required.

This embodiment has an advantage that the absorption and the desorption of the hydrocarbon (HC) contained in the exhaust-gas can always be performed as long as the exhaust-gas temperature is lower than the heat resistant temperature of the absorbent 6.

Now still another embodiment of the exhaust-gas purification device according to the present invention will be described below with reference to FIG. 6.

Figure 6:
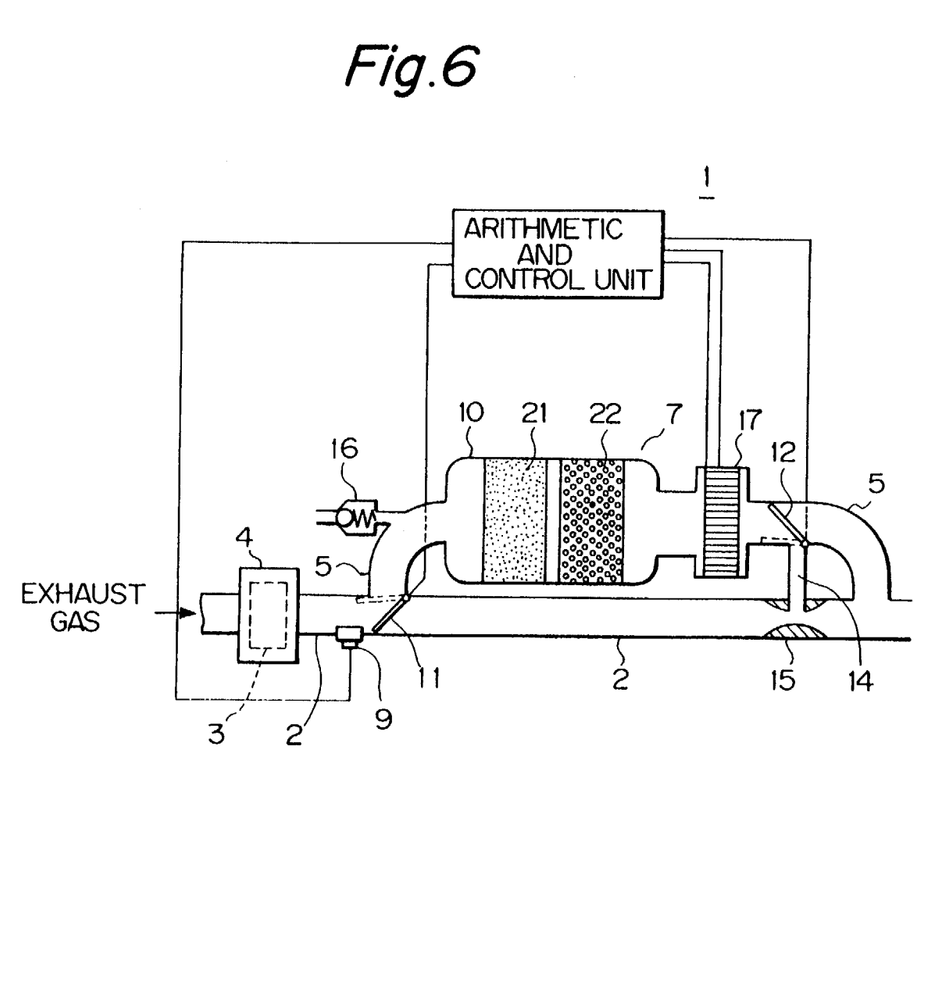
FIG. 6 is a schematic diagram of further embodiment of the exhaust-gas purification device in accordance with the present invention.

In the embodiment shown in FIG. 6, the absorbent 6 carried in the second purification-treatment section 7 is composed of at least two absorbent-layers whose absorption/desorption properties for a given component are different each other.

In the embodiments of FIGS. 1 and 2, the absorbent 6 is composed of a single absorbent-layer. For example, a single layer of active carbon can absorb hydrocarbon (HC) only at the exhaust-gas temperature below 100° C. A single layer of zeolite can absorb hydrocabon (HC) up to 300° C., but its HC absorbing ability is inferior to that of a single layer of active carbon at very low temperature (below 50° C.).

Thus, in this embodiment shown in FIG. 6, the absorbent 6 in the second purification-treatment section 7 has a two-layer construction as shown. As an example, the front layer (i.e., the layer upstream along the flow direction of the bypass passage) is made of active carbon and the rear layer (i.e., the layer downstream from the front layer) is made of zeolite. The operations of this embodiment are similar to those of the embodiment shown in FIG. 3 except that its absorbing temperature ($T_A$) is the highest absorbable temperature of zeolite and its desorbable temperature ($T_D$) is the highest desorbable temperature of active carbon. In this embodiment, its heat resistant temperature ($T_B$) is the lower one of the heat resistant temperature of these two absorbents, that is, the heat resistant temperature ($T_B$) of active carbon.

Figure 7:
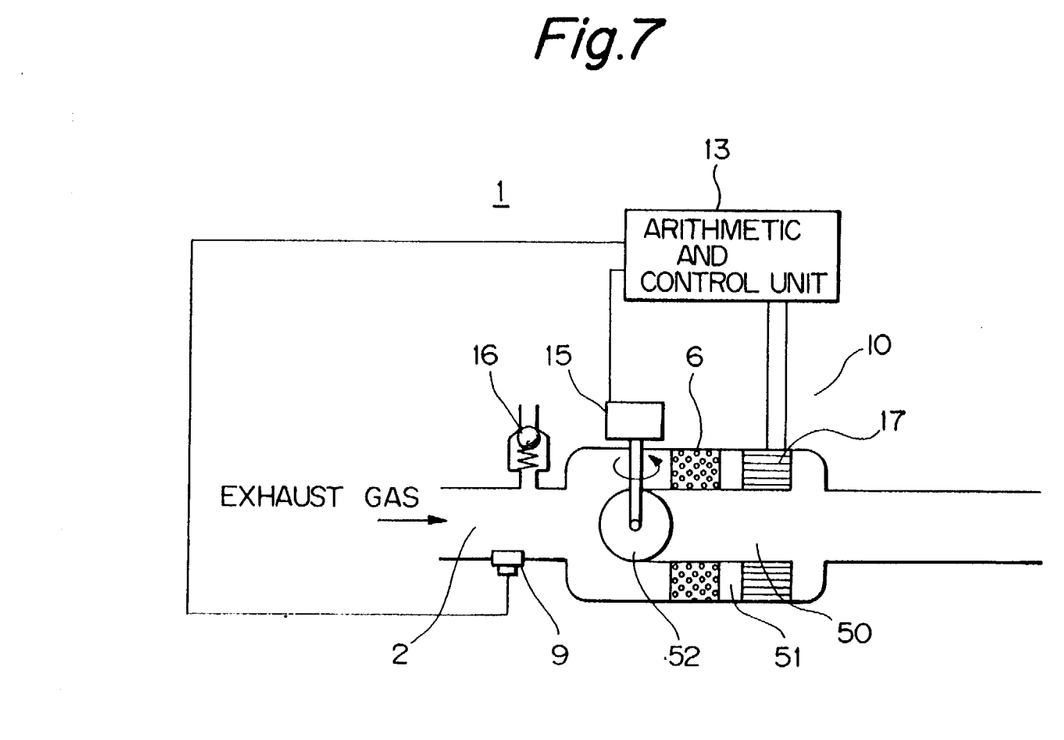
FIG. 7 is a schematic diagram of still further embodiment of the exhaust-gas purification device in accordance with the present invention.

Now still another embodiment of the exhaust-gas purification device according to the present invention will be described below with reference to FIG. 7.

In each of the above-mentioned embodiments, the exhaust-gas purification device 1 has a construction that an absorbing cylinder 10 is installed in the bypass passage 5 diverging from the main exhaust passage 2 of the exhaust system. In this embodiment shown in FIG. 7, the main exhaust passage 2 is composed of a main passage 50 and a sub passage 51 as one body so that the improvement in ease of assembly and the miniaturization of the exhaust-gas purification device can be achieved.

In this embodiment, unlike above-mentioned embodiments, a section of the main exhaust passage 2 has the above-stated construction and, further, a selector valve 52 is placed in said section of the main exhaust passage 2. The main passage 50 is placed in the central section of the absorbing cylinder 10. The sub passage 51 is installed outside the main passage 50, and an absorbent 6 and a catalyst 17 equipped with a heater are contained in the sub passage 51. When the selector valve 52 blocks off the main passage 50, the exhaust-gas flows through the sub passage 51. When the selector valve 52 opens the main passage 50, the exhaust-gas flows through the main passage 50. In order to prevent the exhaust-gas from flowing into the sub passage 51 while the selector valve 52 is open, it is possible to use, as the absorbent 6, a pellet-type or bead-type absorbent which provides a relatively large pressure-loss. Furthermore, for this purpose, it is also possible to install a choke such as an orifice (not shown) in the inlet of the sub passage 51. Further the flow chart which shows the operation of this embodiment is similar to that shown in FIG. 3.

Since the exhaust-gas purification device according to the present invention is located downstream from the catalyst device which is placed in the exhaust passage of an internal combustion engine, the exhaust-gas from the engine does not heat the absorbent to a high temperature and the absorbent can absorb a large quantity of toxic components in its relatively low temperature condition.

When the toxic components absorbed in the absorbent are desorbed, they are released into the air after having been purified by the catalyst 17 equipped with a heater. Therefore there arise no environmental pollution problems.

These successive operations can reliably be controlled by a control device according to the exhaust-gas temperatures detected by the exhaust-gas temperature sensor placed upstream from the absorbent.

Thus, since the exhaust-gas purification device in accordance with the present invention adopts the above mentioned technical constructions, it can overcome the drawbacks of the prior art and can effectively purify the hydrocarbon (HC) among the toxic components of the exhaust-gas emitted by an internal combustion engine or the like even when the temperature of said exhaust-gas is relatively low.

In the above-mentioned embodiments, the absorbent 6 and the catalyst 17 with a heating means are provided in the bypass passage diverged from the main exhaust passage.

In another embodiment of an exhaust-gas purification device of the present invention, the absorbent 6 and the catalyst 17 with a heating means may be provided in the main exhaust passage, and in this embodiment, no by-pass passage is used.

Figure 8:
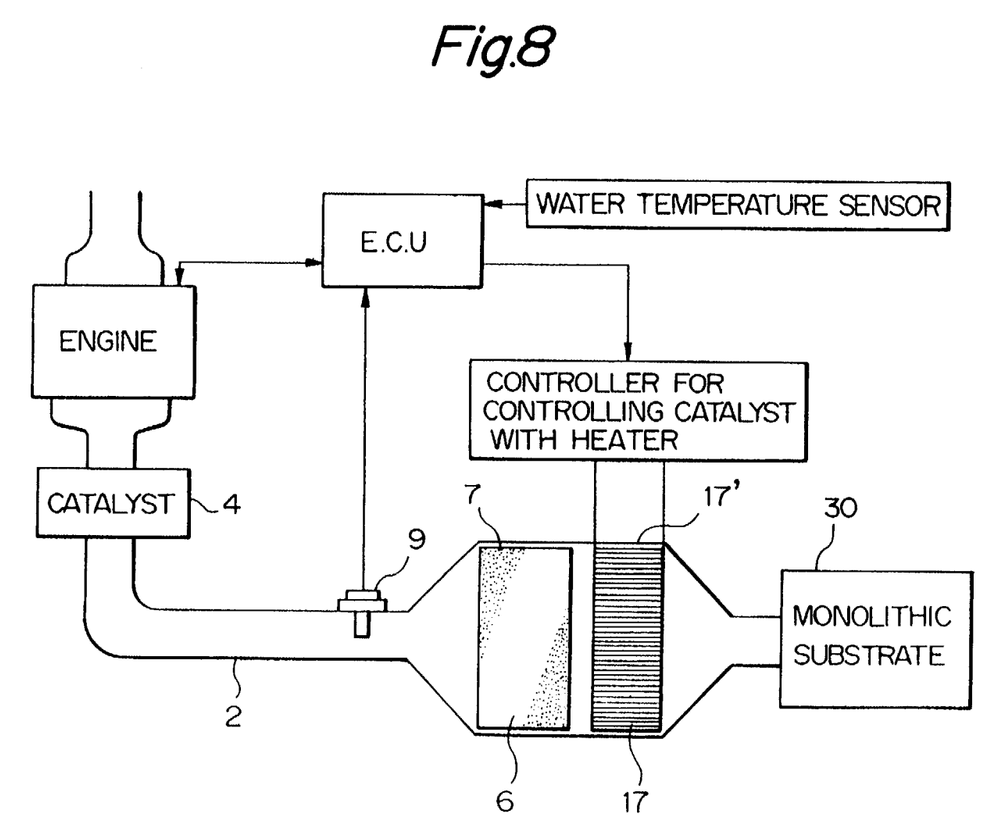
FIG. 8 is a schematic view showing another embodiment of the exhaust-gas purification in accordance with the present invention.

In accordance with this embodiments, as shown in FIG. 8, an exhaust-gas purification device for an internal combustion engine or the like of the present invention, has an exhaust system in which a first purification-treatment section 4 carrying a catalyst, is placed in a main exhaust passage 2 and further in said main exhaust passage 2, an absorbent 6 and a catalyst 17 accompanied by a heating means, are provided in said main exhaust passage 2 to form subsequent purification-treatment sections such as a second purification-treatment section 7 and a third purification-treatment section 17' and downstream from said first purification-treatment section 4.

In FIG. 8, a monolithic substrate 30 should be provided in the main exhaust passage 2 downstream the catalyst 17.

Figure 9:
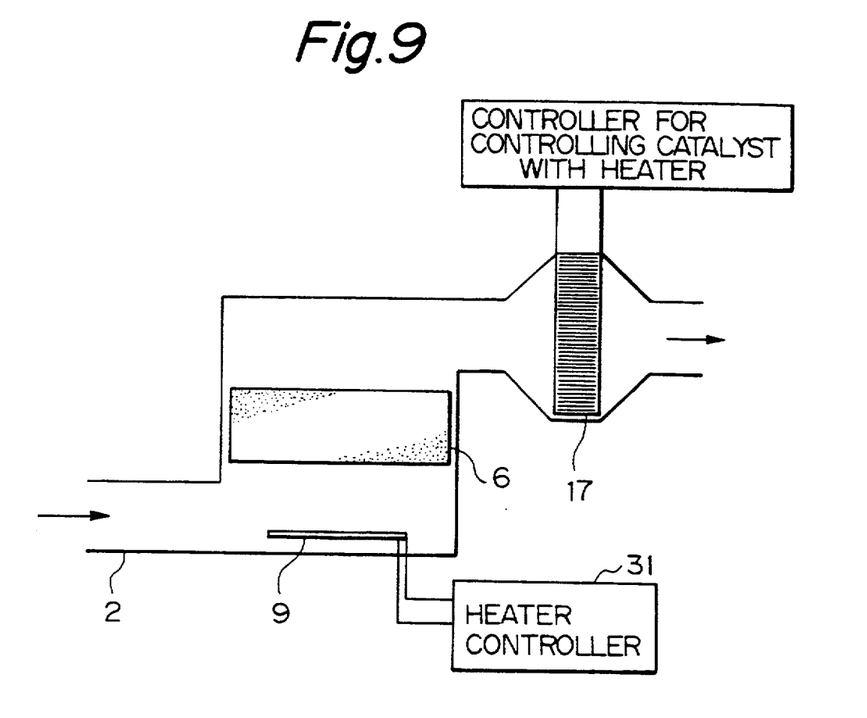
FIGS. 9 and 10 are schematic views showing separate embodiments of the exhaust-gas purification in accordance with the present invention.

Further, as shown in FIG. 9, a separate heating means 31 can be provided in the main exhaust passage 2 upstream the absorbent 6 as a separate embodiment of the present invention.

Figure 10:
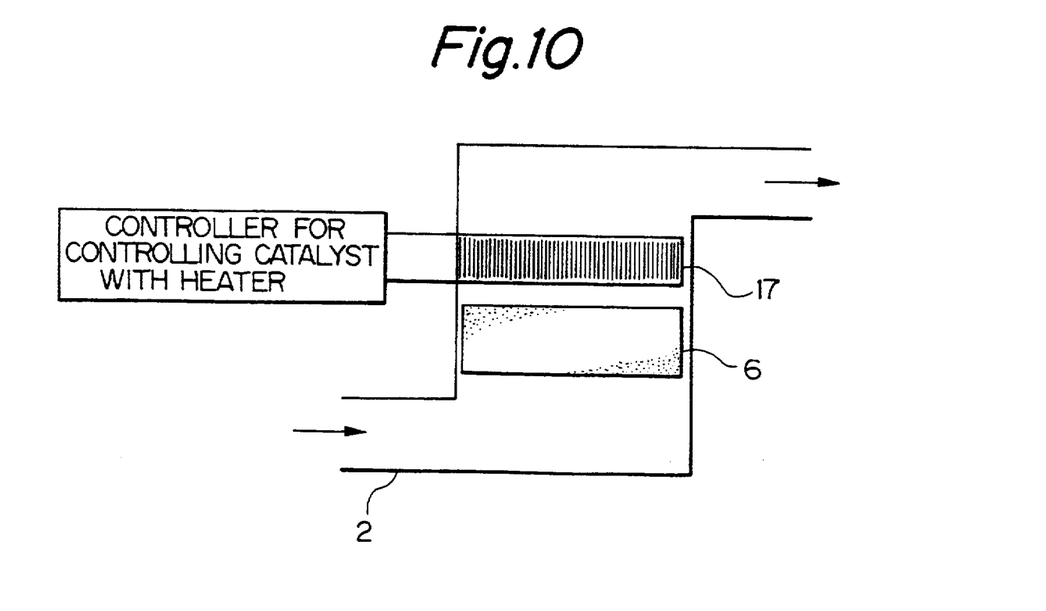

According to other embodiment of the present invention, an absorbent 6 and a catalyst 17 with a heating means, can be provided with each other in the main exhaust passage in such a positional configuration as shown in FIG. 10, so that the absorbent 6 can be heated with heating energy radiated or transmitted from the catalyst with a heating means.

We claim:

1. An exhaust-gas purification device for an internal combustion engine or the like, comprising:

a first purification-treatment section carrying a catalyst therewith and being provided in a main exhaust passage;

a bypass passage placed downstream from said first purification-treatment section, said bypass passage diverging from said main exhaust passage and later returning to said main exhaust passage at a certain distance;

a second purification-treatment section placed in said bypass passage and carrying an absorbent therein for absorbing hydrocarbon contained in an exhaust gas emitted from said internal combustion engine or the like;

a first passage selector means for changing a main direction of an exhaust gas stream to either one of said main exhaust passage or said bypass passage;

a third purification-treatment section placed downstream from said second purification-treatment section which is provided in said bypass passage, said third purification-treatment section carrying a catalyst and a heating means for heating said catalyst therewith; and a control means for controlling said first passage selector means so that when a temperature of said exhaust gas is below a predetermined temperature, said main direction of an exhaust gas stream is set at a direction corresponding to said bypass passage while when a temperature of said exhaust gas exceeds said predetermined temperature, said main direction of an exhaust gas stream is set at a direction corresponding to said main exhaust passage, and for controlling said heating means provided in said second purification-treatment section so that when said hydrocarbon absorbed in said second purification-treatment section is desorbed from said absorbent, said heating means provided in said third purification-treatment section is heated to thereby purify said hydrocarbon absorbed in said second purification-treatment section.

2. An exhaust-gas purification device according to claim 1, which further comprises, downstream from said second purification-treatment section in the bypass passage, a second passage selector section placed in the vicinity of a junction between said bypass passage and said main exhaust passage.

3. An exhaust-gas purification device according to claim 1, which further comprises, in said bypass passage and downstream from said second purification-treatment section, a desorption passage which directly connects said bypass passage to said main exhaust passage wherein said desorption passage is placed at an appropriate position between said junction formed between said bypass passage and said main exhaust passage and said second purification-treatment section.

4. An exhaust-gas purification device according to claim 1, which further comprises, in said main exhaust passage, a static-pressure reducing means for reducing pressure in said desorption passage placed in the vicinity of a junction between said desorption passage and said main exhaust passage.

5. An exhaust-gas purification device according to claim 1, wherein said absorbent, carried in the second purification-treatment section, is composed of at least two absorbent-layers whose absorption/desorption properties for a given component are different from each other.

6. An exhaust-gas purification device according to claim 1, which further comprises, in said bypass passage, a check valve placed upstream from said second purification-treatment section.

7. An exhaust-gas purification device according to claim 1, which further comprises a heater placed in said second purification-treatment section.

8. An exhaust-gas purification device according to claim 1, which further comprises a section of the main exhaust passage composed of a main passage and a sub passage;

a passage-selector means for opening one of said main passage or said sub passage and blocking off the other to the exhaust-gas flowing through the main exhaust passage, which is placed in a common section of both said main passage and said sub passage, and said absorbent is placed in said sub passage.

9. An exhaust-gas purification device for an internal combustion engine or the like according to claim 1, wherein said control means is controlled by a temperature sensor for detecting a temperature of said exhaust gas which is provided in either said main exhaust passage or said bypass passage.

10. An exhaust-gas purification device according to claim 3, wherein said second passage-selector means is placed in the vicinity of a junction between said bypass passage and said desorption passage.

11. An exhaust-gas purification device for an internal combustion engine or the like, comprises:

a first purification-treatment section carrying a catalyst therewith and being provided in a main exhaust passage;

a bypass passage placed downstream from said first purification-treatment section, said bypass passage diverging from said main exhaust passage and later returning to said main exhaust passage at a certain distance;

a second purification-treatment section placed in said bypass passage and carrying an absorbent therein for absorbing hydrocarbon contained in an exhaust gas emitted from said internal combustion engine or the like;

a first passage selector means for changing a main direction of an exhaust gas stream to either one of said main exhaust passage or said bypass passage;

a third purification-treatment section placed downstream from said second purification-treatment section which is provided in said bypass passage, and carrying a catalyst and a heating means for heating said catalyst therewith;

a desorption passage for directly connecting said bypass passage and said main exhaust passage and placed at an appropriate position locating in said bypass passage, and formed between an downstream end portion of said second purification-treatment section and a junction point at which said bypass passage and said main exhaust passage are joined to each other;

a static-pressure reducing means placed in the vicinity of said junction point for generating a negative pressure inside said bypass passage;

a second passage selector section placed in the vicinity of said junction point at which said bypass passage and said desorption passage are joined to each other; and a control means for controlling said first passage selector means so that when a temperature of said exhaust gas is below a predetermined temperature, said main direction of an exhaust gas stream is set at a direction corresponding to said bypass passage while when a temperature of said exhaust gas exceeds said predetermined temperature, said main direction of an exhaust gas stream is set at a direction corresponding to said main exhaust passage, and for controlling said heating means provided in said second purification-treatment section so that when said hydrocarbon absorbed in said second purification-treatment section, is desorbed from said absorbent, said heating means provided in said third purification-treatment section is heated to thereby purify said hydrocarbon absorbed in said second purification-treatment section.

* * * * *